United States Patent [19]
Hornsby et al.

[11] Patent Number: 5,979,299
[45] Date of Patent: Nov. 9, 1999

[54] BEVERAGE INFUSION MAKING APPARATUS

[76] Inventors: David J. Hornsby, 109 Winchester Street, London SW1V 4NX; Barry J. Dineen, Greenbank, Summerhowe Cottages, Skelsmergh, Kendal, Cumbria LA9 6NY, both of United Kingdom

[21] Appl. No.: 08/952,293

[22] PCT Filed: May 8, 1996

[86] PCT No.: PCT/GB96/01092

§ 371 Date: Feb. 5, 1998

§ 102(e) Date: Feb. 5, 1998

[87] PCT Pub. No.: WO96/35360

PCT Pub. Date: Nov. 14, 1996

[30] Foreign Application Priority Data

May 9, 1995 [GB] United Kingdom .................... 9509325

[51] Int. Cl.⁶ .................................................. A47J 31/20
[52] U.S. Cl. ................. 99/297; 99/295; 426/433
[58] Field of Search .......................... 99/297, 287, 302 P, 99/295; 426/433

[56] References Cited

U.S. PATENT DOCUMENTS

| 3,657,993 | 4/1972 | Close ........................................ 99/297 |
| 5,275,089 | 1/1994 | Armellin ................................ 99/297 X |

FOREIGN PATENT DOCUMENTS

| 32850 | 1/1981 | European Pat. Off. . |
| 615714 | 9/1994 | European Pat. Off. . |
| 658312 | 3/1938 | Germany . |
| 3432289 | 10/1985 | Germany . |
| 2249021 | 4/1992 | United Kingdom . |

Primary Examiner—Reginald L. Alexander
Attorney, Agent, or Firm—Price, Heneveld, Cooper, DeWitt & Litton

[57] ABSTRACT

A plunger filter infusion device comprises a container, a plunger having a resilient plunger head slidable within the container and an insert placeable in the base of the container. Infusible material is placed in the insert, heated water is poured into the container and the plunger is slid into the container until the plunger head engages the insert. The infusible material is thus confined by the plunger head in the insert and the plunger head and insert can be removed allowing clean and simple disposal of the infusible material.

22 Claims, 9 Drawing Sheets

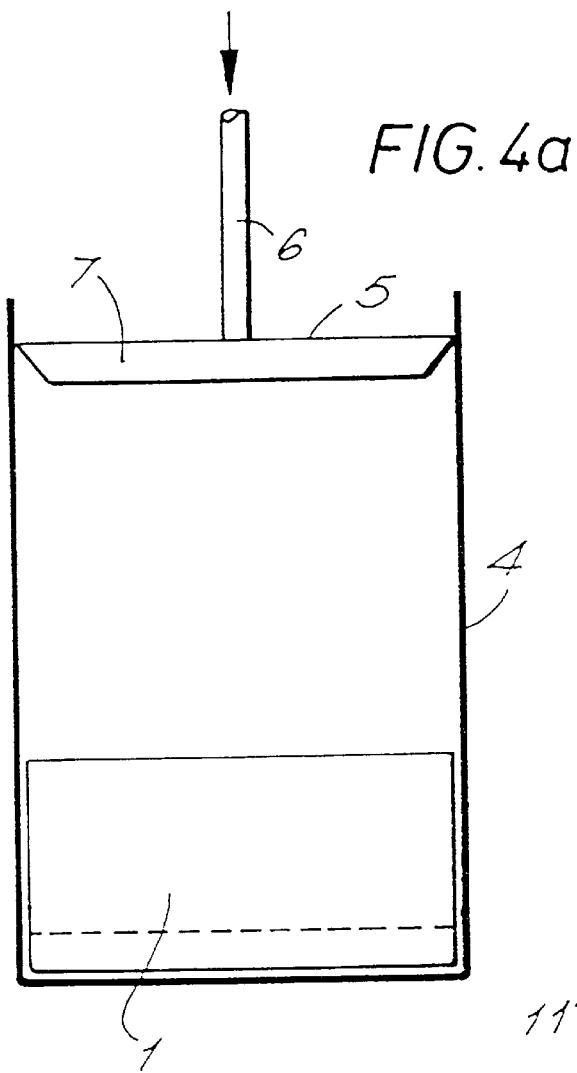
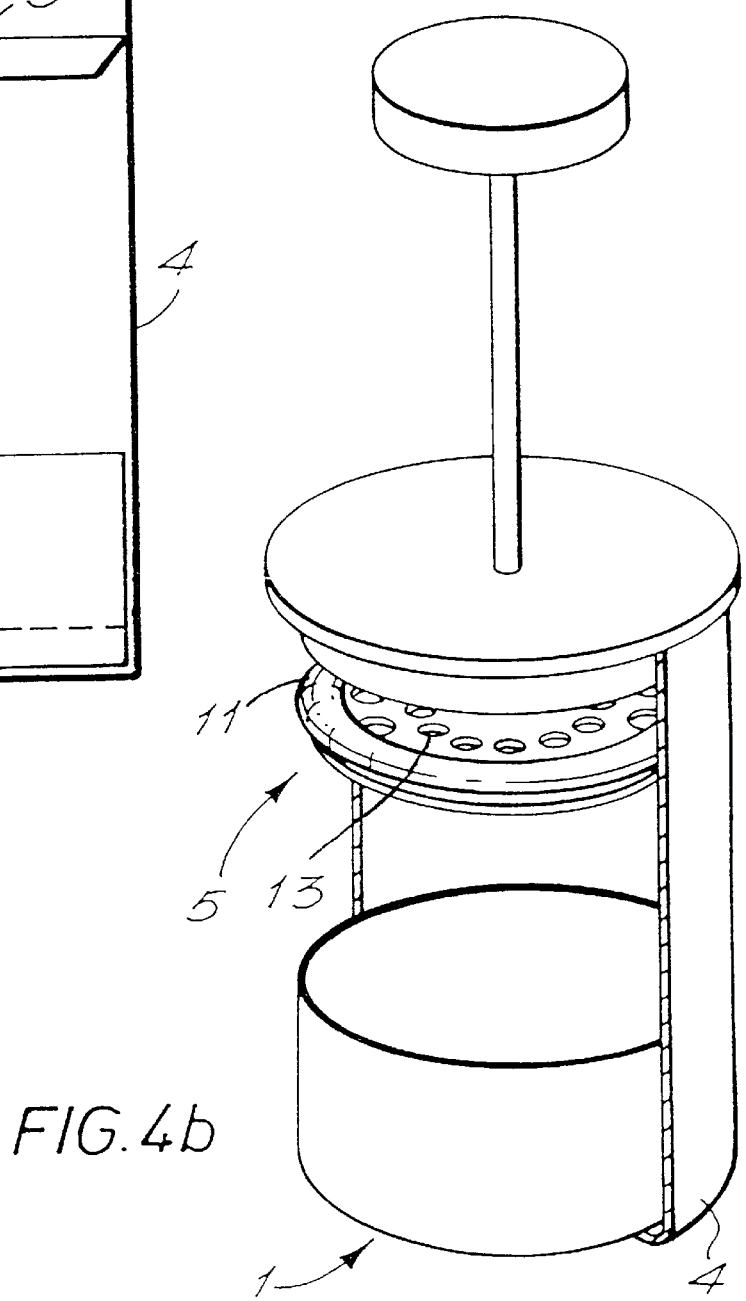

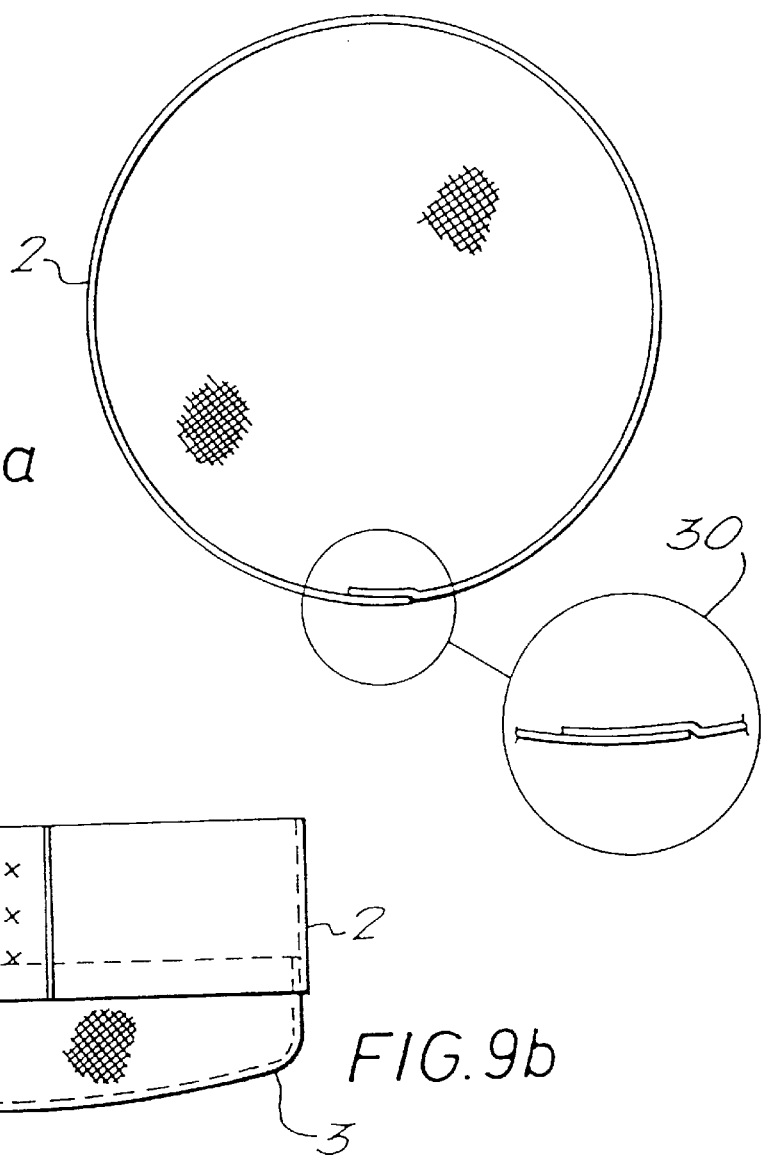
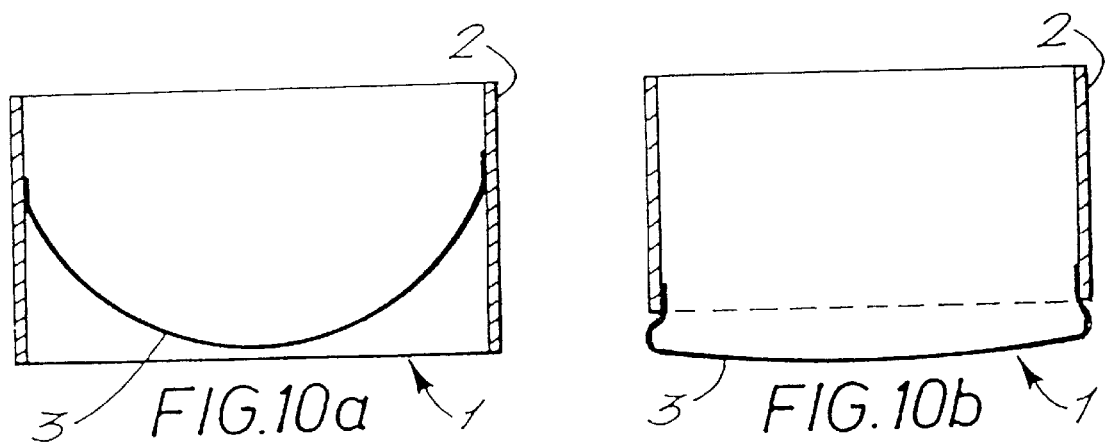
FIG.9a
FIG.9b
FIG.10a
FIG.10b

BEVERAGE INFUSION MAKING APPARATUS

The present invention relates to a beverage infuser comprising a container, a plunger, and a beverage infuser insert.

One known beverage infuser is the cafetiere (a trade mark) plunge-filter beverage infuser (also known as a French Press—a trade mark) which generally comprises a cylindrical container, for example of glass or ceramic, and a plunge-filter comprising a perforated plunger. In use, coffee grounds are placed in the base of the container and boiling water is poured into the container. The infusion is left to brew, and the plunger is inserted into the container and pushed to the bottom of the container to confine the coffee grounds and allow the coffee to be poured.

A problem arises with this known arrangement, however, when it is desired to wash the container after use. At that stage the plunger is removed and the coffee grounds are poured from the container into a sink or a bin. The operation is generally very messy and it is usually necessary to flush residual coffee grounds down the sink with copious quantities of water which is time consuming and wasteful.

According to the present invention there is provided a beverage infuser comprising a beverage container, a plunger having a perforated head slidable within the container and a cup-shaped insert, wherein the plunger head is slidable into engagement with the insert to releasably attach the insert to the plunger. In that arrangement, the insert is placed in the container, together with infusible material, for example uninfused coffee grounds, and, after the infusion period, the grounds are confined in the insert by sliding the plunger into the container and into engagement with the insert so that the insert attaches to the plunger. When it is desired to dispose of the coffee grounds, the plunger and insert are withdrawn from the container, the insert is detached from the plunger and the residual coffee grounds are disposed of quickly and without mess simply by tipping them from the insert into a suitable receptacle. The cup-shaped insert comprises any suitable retentive insert for holding infusible material, may be any of a range of heights depending on, for example, the quantity of infusible material required and is generally slidable within the container. The term "cup-shaped" embraces any suitable cross-section profile viewed in the vertical plane—for example rectangular or hemispherical, and any is suitable cross-sectional base profile—for example linear, concave or convex.

The plunger head may have an outwardly resiliently biased perimeter of larger dimension than the inside of the insert for engaging the inside surface of the insert. A simple method of engagement, attachment and detachment is thereby provided.

The container, plunger head and insert may be of circular cross-section, the head may include a perforated gauze material extending across the head and a spring extending around the perimeter of the head to provide an outward bias, the external diameter of the head being greater than the internal diameter of the insert. According to that example the insert can be simply and inexpensively manufactured as it is not necessary to provide complex attachment means on the insert. In addition, the insert is suitable for use with an unmodified conventional plunge filter infuser and plunger. The insert may be shaped to be a snug fit in the container. The insert can easily be stored in the container and in addition will allow both the plunger and the insert to be retracted from the container easily when the plunger is in engagement with an inside surface of the insert.

At least a portion of the insert may be perforated. For example, the insert may comprise a side wall in the form of a sleeve, and a perforated base. As a result, manufacture of the insert may be yet simpler and cheaper. The perforated base may, for example, be formed of a metallic gauze suitable for straining the beverage from the infusible material such as the gauze commonly forming part of a plunge filter. A portion of the base may be reinforced in order to avoid wear or damage to the base. If it is desired to strengthen the beverage, the plunger and insert may be repeatedly drawn up and down within the container to enhance infusion through the filter material. In addition, the perforation of part of the insert renders it more easy to remove the insert from the plunge filter infuser.

Furthermore, the perforations allow liquid to drain from the insert; the plunger head can be pushed further into the insert to further compress and drain the infusible material as a result of which when the plunger and insert are removed the infusible material confined therebetween is substantially dry. For example, perforations may be provided in the sides of the insert to improve drainage. For example perforations can be provided in the vicinity of the top of the insert such that, when the plunger has been fully driven into the insert to compress and drain the infusible material, any liquid in the insert above the level of the plunger head can drain out of the insert. The disposal and cleaning operation is thus especially simple and free of mess. This is particularly the case as the residual grounds can be compressed to such an extent that they form a cake for simple and clean disposal.

A portion of the insert may be contoured for attachment to the plunger to improve entry. For example, the lip of the insert may be appropriately shaped. Alternatively, or in addition, external contours may be added.

The insert may be calibrated for selected quantities of infusible material. Accordingly, the commonly encountered problem of uncertainty as to the correct amount of, for example, infusible coffee grounds, can be avoided. Coffee grounds may be poured into the insert up to an appropriate calibration mark either before or after the insert is placed in the container. The insert may be pre-filled with a predetermined quantity of infusible material. Pre-filled, disposable or re-fillable inserts can, for example, be manufactured, allowing further ease of use and, where appropriate, close regulation of the amounts of coffee and other beverage infusions used in cafes, restaurants and other commercial operations.

The top end of the insert may be of dimension to form a snug fit with the container when in place in the container. The base of the insert may or may not also fit snugly into the container; the insert is preferably shaped such that it comes into contact with the container so as to allow pressure to be exerted upon the plunger in order to enable engagement of the plunger head with the inside of the insert when the insert has been inserted into the container.

According to the present invention there is further provided a method of making a beverage in a beverage infuser comprising a container, a plunger having a head slidable within the container and a cup-shaped insert, wherein the insert is placed at the base of the container, infusible material is placed in the insert before or after it is placed in the container, heated water is poured into the container, the plunger is inserted into the container and, when the beverage has brewed sufficiently, slid towards the base of the container and into engagement with the insert to attach the insert to the plunger with the infusible material confined therebetween, the plunger and insert attached thereto are withdrawn from the container, the insert is detached from the plunger and the infusible material is disposed of.

The plunger and insert attached thereto may be drawn up and down repeatedly prior to being withdrawn in order to strengthen the infusion.

The plunger and insert may be withdrawn prior to the beverage being poured to render the pouring operation more convenient and visually attractive.

According to the invention there is further provided a beverage infuser comprising a beverage container and an infusible material confining means for insertion into the container, the infusible material confining means comprising a perforated infusible material confining head and a handle, the head being releasably fastenable to the handle.

The infusible material confining means may comprise a plunger slidable within the container.

According to the invention there is further provided a method of making a beverage in a beverage infuser comprising a container and an infusible material confining means comprising a perforated infusible material confining head releasably fastenable to a handle, wherein the head is pre-filled with infusible material and fastened to the handle, the infusible material confining means is inserted into the container together with heated water and withdrawn from the container once the beverage has brewed, the head is detached from the handle and the infusible material is disposed of.

Embodiments of the invention will now be described by way of example with reference to the accompanying drawings of which:

FIG. 4a shows a plunger being inserted into the container shown in FIG. 3;

FIG. 4b is a cut-away perspective view of the arrangement shown in FIG. 4a;

FIG. 5b is a cut-away perspective view of the arrangement shown in FIG. 5a;

FIG. 8c is a plan view of the stand of FIG. 8a;

FIG. 8d is a side view of the stand of FIG. 8a;

FIG. 8e is a side view of the stand of FIG. 8a;

FIG. 9a is a plan view of an alternative form of an insert according to the present invention;

FIG. 9b is a side view of the insert of FIG. 9a;

FIG. 10a is a sectional side view of a further alternative insert according to the present invention;

FIG. 10b is a sectional side view of yet a further alternative insert according to the present invention;

FIG. 11b shows insertion of the insert into the container of FIG. 11a;

FIG. 11c shows the plunger and insert in place according to the arrangement of FIG. 11a; and FIG. 11d shows removal of the plunger and insert for the arrangement shown in FIG. 11a.

Figure 1:
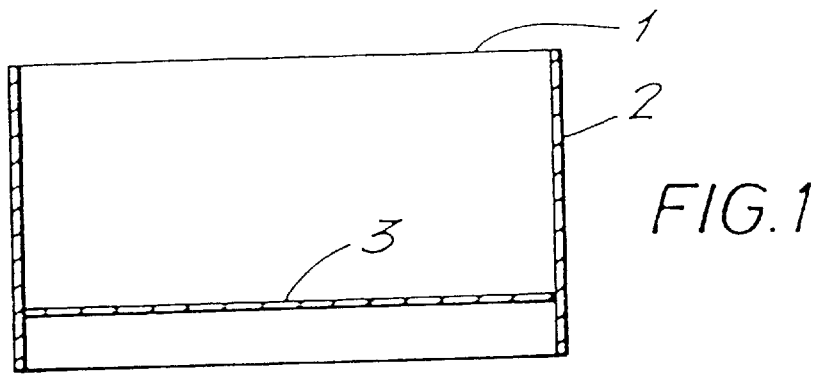
FIG. 1 is cross-sectional view of a beverage infuser insert.
Figure 2:
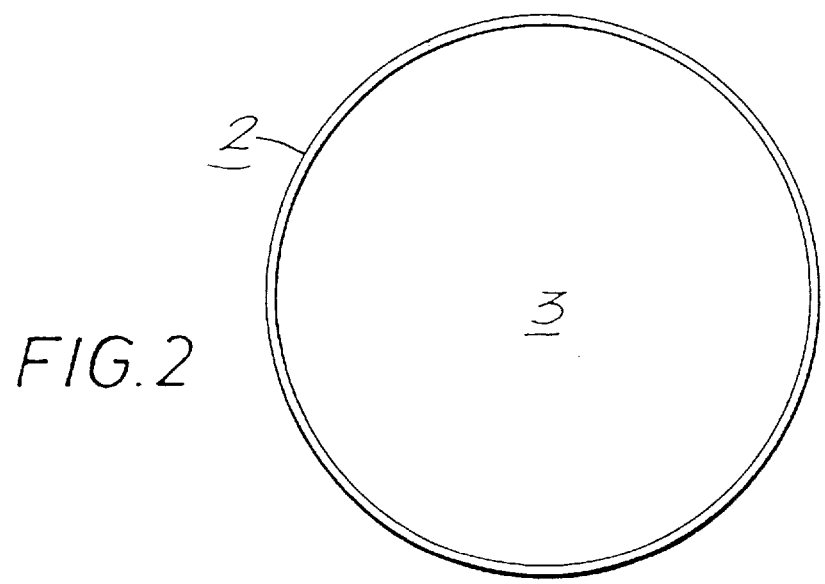
FIG. 2 is a plan view of the insert.

As can be seen from FIGS. 1 and 2, the beverage infuser insert 1 is generally cup-shaped and comprises a side wall 2 in the form of a cylindrical sleeve, and a base 3. The side wall 2 may be formed, for example, from a single strip of metal or plastics material, bent round with the ends bonded together to form a cylinder. One form of bonding is shown in FIG. 9a wherein overlapping ends of the strip are joined by adhesive, welding or rivets as shown in the enlarged partial view 30. Alternatively it may be formed integrally as a cylinder cut, for example, from a single cylindrical length of material. Other suitable means of forming the side wall will be apparent to the skilled man. Materials used in a conventional cafetiere beverage infuser, for example stainless steel, may be used to make the arrangement more attractive. The base 3 may be formed of a similar material to the side wall 2 or may be formed of a filter material or perforated material such as the metallic gauze used on a plunge filter. The base 3 is bonded to the side wall 2 in any conventional manner. The insert 1 can be disposable or re-usable.

Figure 3:
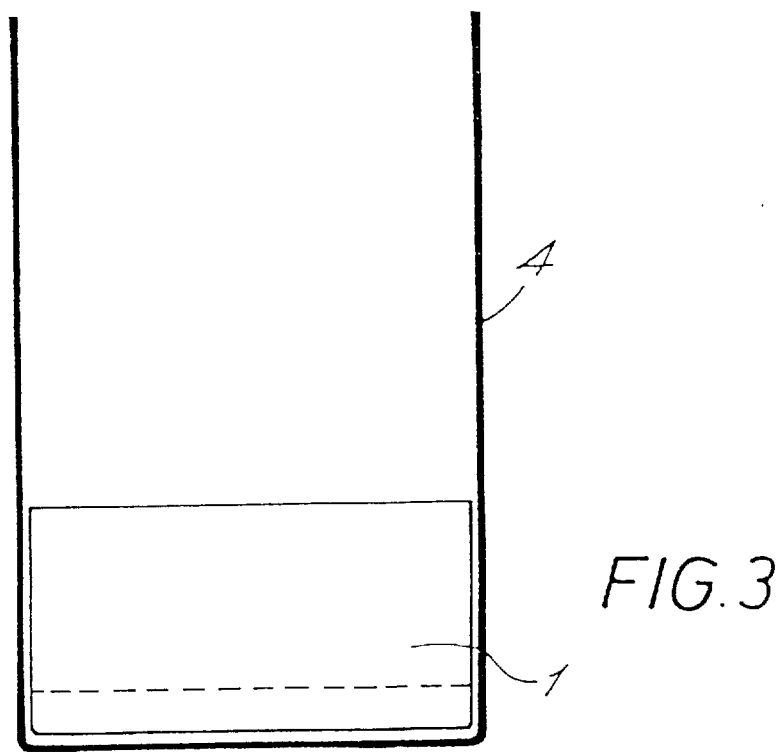
FIG. 3 is a diagrammatical side view of the insert in place in a beverage infuser container.

The insert 1 is shaped to fit inside the container 4 of a beverage infuser such as a conventional cafetiere beverage infuser having a circular cross-section and, as can be seen from FIG. 3, the insert is a snug slidable fit that is, it has a circular perimeter to fit closely inside the container. Indeed, the insert can be stored in the container even when not in use. The container can be made of glass, plastic, ceramic or other suitable material. The infuser includes a cylindrical container 4 and a plunger 5 (for example a plunge filter) insertable in the container for confining the coffee grounds once the coffee has brewed. The plunger 5 is shown diagrammatically in, for example, FIG. 4, but a conventional plunger has a shaft 6 with a handle (not shown) at one end and, at the other end, a head 7 having a metallic gauze filter material 13 extending there-across for straining coffee grounds from the beverage. A helical spring 11 extends around the perimeter of the head 7 and the edge of the gauze is loaded outwardly by the spring for substantially continuous engagement with the container wall. In an alternative system the plunger head comprises a resilient plastic rim having a radial flange; as will be clear from the following discussion any plunger having a resilient perimeter may be used in conjunction with the invention.

Figure 5A:
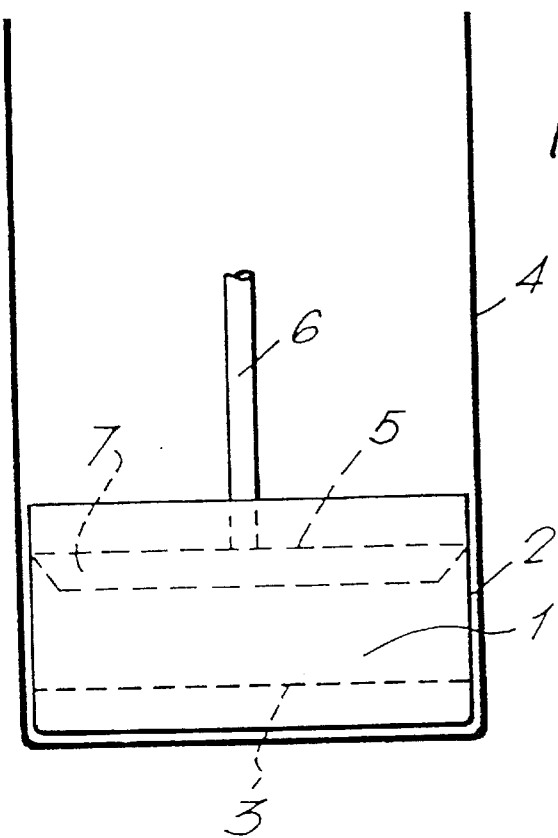
FIG. 5a shows the plunger fully inserted into the container and into the insert.
Figure 5B:
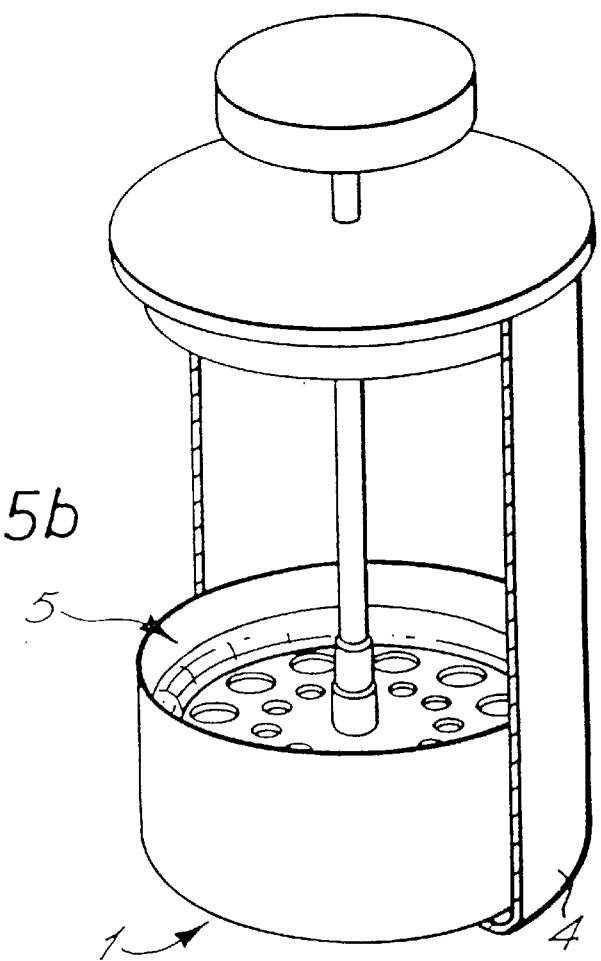
Figure 6:
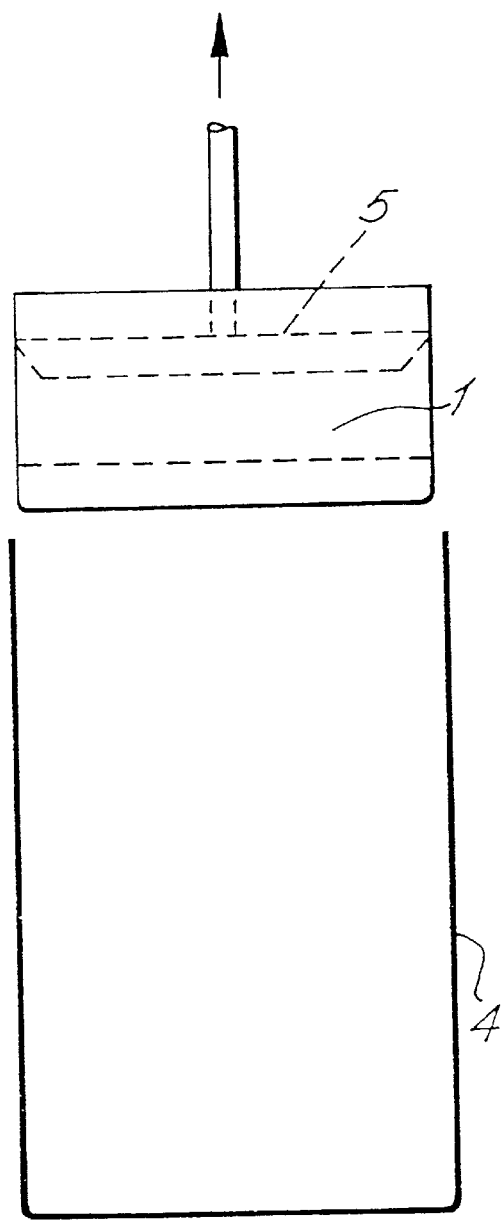
FIG. 6 shows the plunger removed from the container and with the insert attached.

Operation of the apparatus will now be described with reference to FIGS. 4 to 7. The insert 1 is inserted in the cafetiere container 4, coffee grounds are added and boiling water is poured into the container. The plunger 5 is inserted at the top of the container 4 as shown in FIGS. 4a and 4b and once the coffee has brewed sufficiently the plunger is pushed slowly downwards. As the head 7 of the plunger 5 is pushed into the container, as shown in FIGS. 5a and 5b, the coffee grounds are directed into the insert by the descending plunger and the plunger comes into contact with and engages the inside of the side wall 2 of the insert 1 as a result of which the coffee grounds are confined in the space between the plunger, the side wall 2 of the insert and the base 3 of the insert. The side wall 2 may have a lip to facilitate entry of the plunger head 7.

The spring at the periphery of the plunger head 7 is compressed by the side wall of the insert 1 and acts as a one way clutch as a result of which the insert is releasably attached to the plunger 5. The spring either acts on the gauze of the plunger head to engage the insert as discussed above, or the spring may engage the insert directly. The gauze may itself be resilient enough to engage the insert to a suitable extent.

In an alternative mode of operation all the coffee may be poured out of the container—with the plunger in place in the container—and then the plunger can be slid into engagement with the insert.

When the plunger 5 is pulled out of the container 4 (either before or after the coffee is poured) as shown in FIG.

Figure 7:
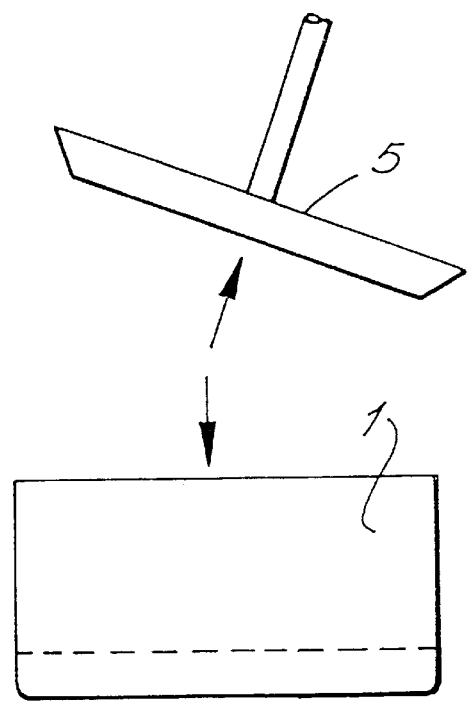
FIG. 7 shows the insert detached from the plunger.

6 the plunger and insert containing the infusible material remain in engagement and the used coffee grounds remain confined therebetween. Once the plunger 5 has been fully retracted the insert 1 can be detached as shown in FIG. 7 simply by pulling the plunger head 7 and insert 1 apart. The coffee grounds may then be disposed of quickly and cleanly. Because the plunger and insert can be removed from the container prior to the drink being poured, the arrangement provides an alternative method of serving coffee brewed in a plunge filter which is very convenient to use and also looks more attractive when the drink is poured, for example, at the table.

Because the plunger and insert can be removed prior to pouring the drink, advantages are arrived at if it is desired to heat the drink or maintain the drink at a desired temperature subsequently. For example this may be the case where the container comprises a vacuum flask, or where the container is placed on a heater such as a stove top or a trivet. In such cases, with prior arrangements, the coffee grounds have been left in the container as a result of which over-brewing can take place giving rise to an unpleasant taste and an unacceptably high level of bitterness especially when the drink is left to heat for a prolonged period of time.

Figure 8A:
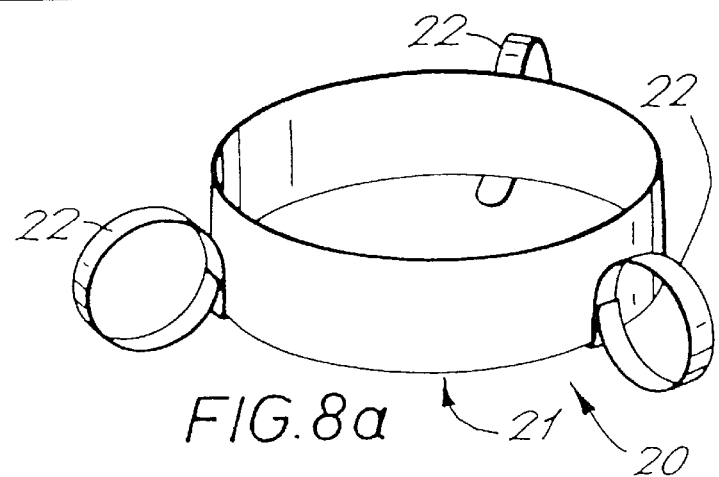
FIG. 8a shows a stand for use in conjunction with the invention.
Figure 8B:
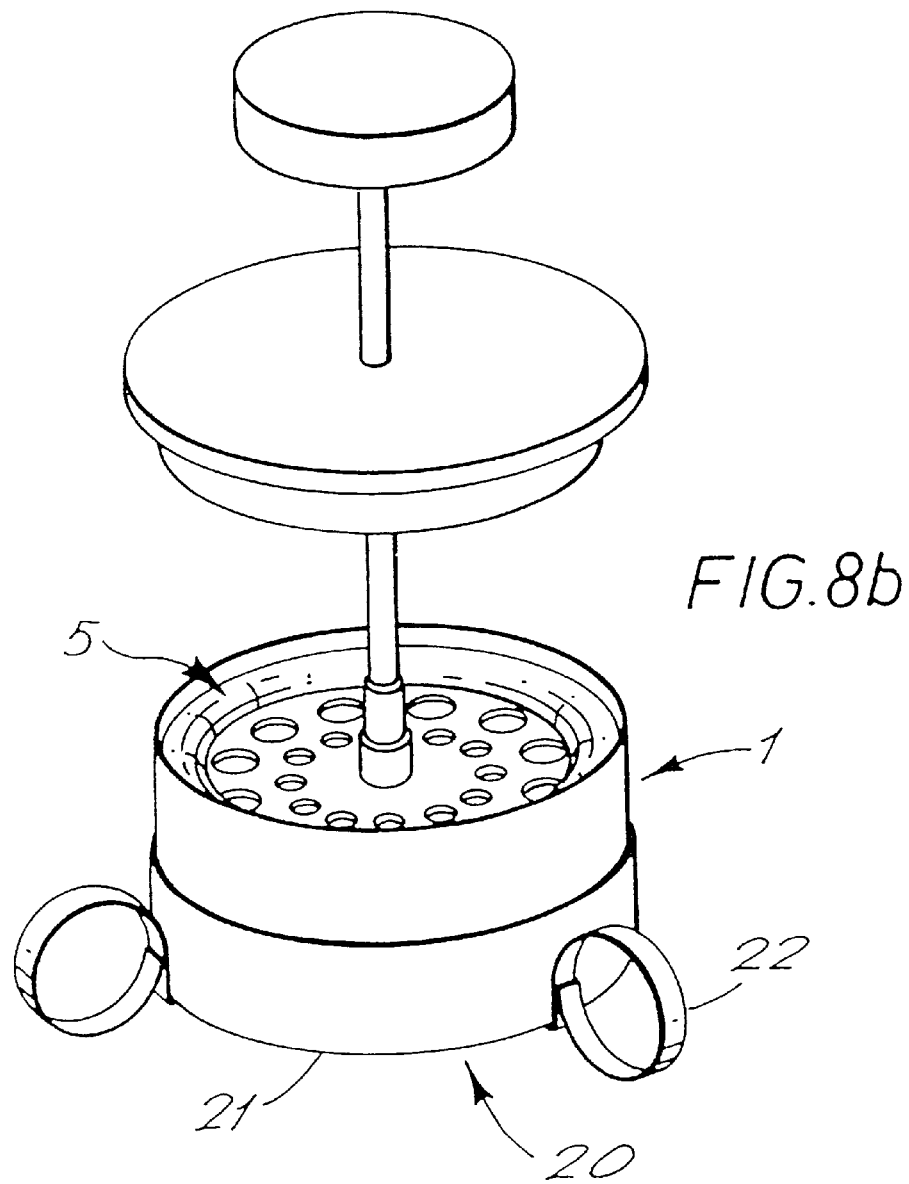
FIG. 8b shows the stand of FIG. 8a with a plunger and insert mounted thereon.

Referring to FIGS. 8a and 8b a stand is shown for mounting the plunger and insert when they have been removed from the container. Referring to FIG. 8a the stand 20 comprises a ring 21 formed, for example, from a band of steel or other material wrapped into a cylindrical shape and suitably bonded, together with supports 22. Three supports 22 are provided at 120° angles although more supports can of course be added. The supports extend below the lower edge of the ring 21 to elevate the ring above the surface upon which it is stood. The supports are shown in the form of smaller rings, preferably formed of the same material as the main ring 21, bonded to the main ring 21 in any appropriate fashion. Of course other supports such as legs can be provided. FIG. 8b shows the stand 20 holding an insert 1 and plunger 5 that have been removed from the container. The stand 20 allows the insert 1 and plunger 5 to be placed securely on a suitable surface, for example while the infused material cools. As the stand 20 is elevated, improved drainage is achieved. The stand can be placed on a suitable receptacle to catch liquid draining from the insert, or can be placed in the sink.

Figure 8E:
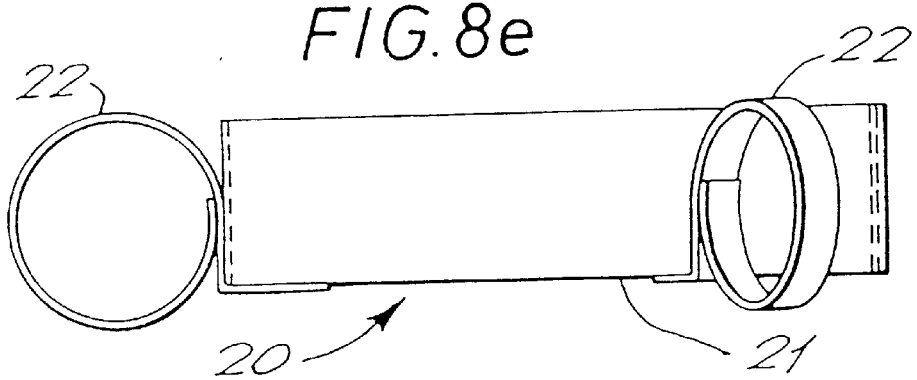
Figure 8C:
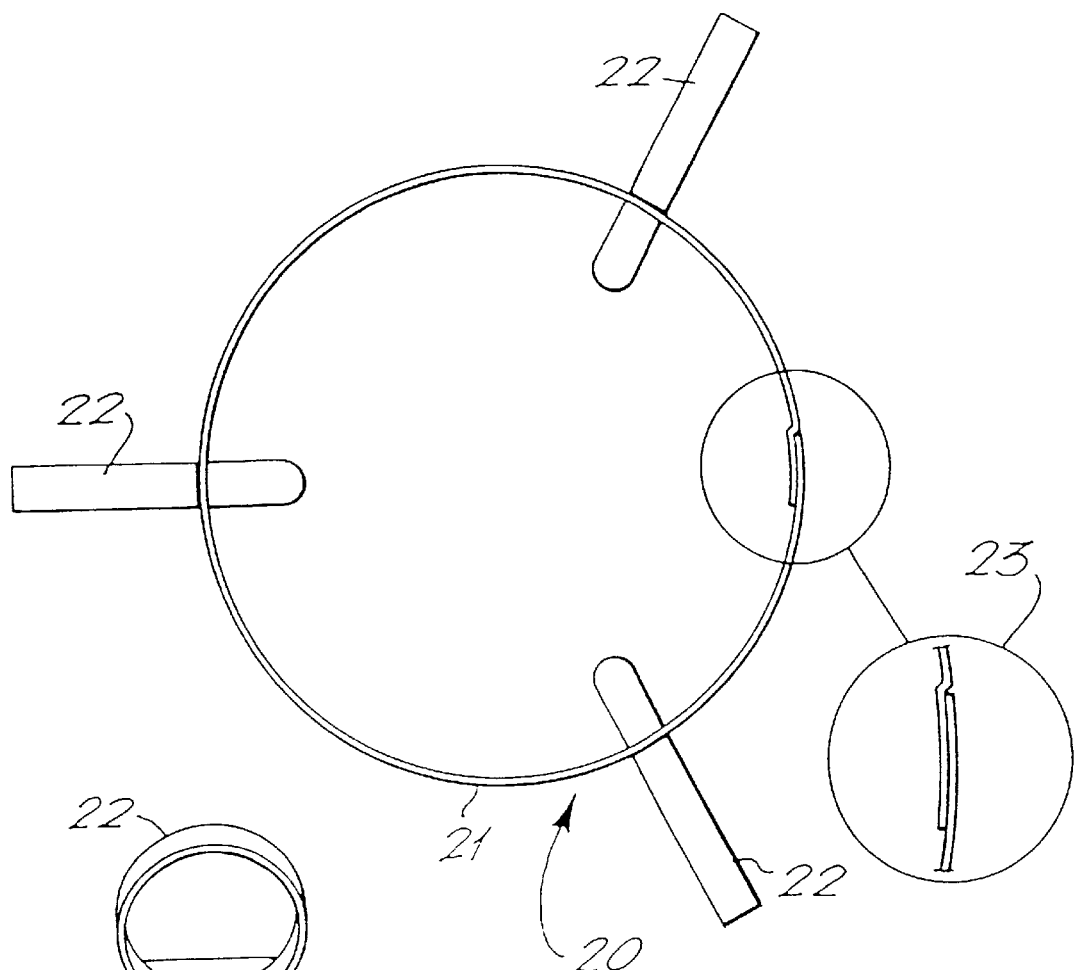
Figure 8D:
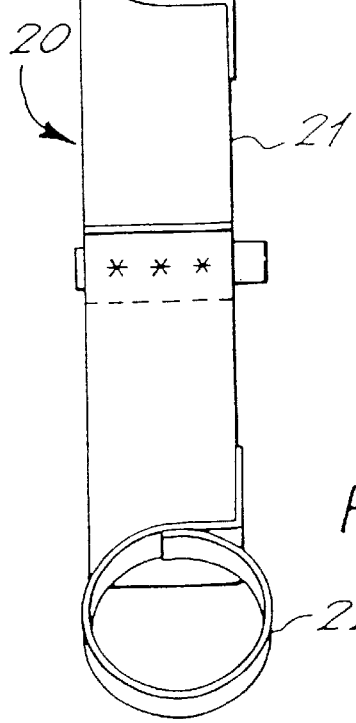

FIGS. 8c to 8e show plan and side views of the stand 20. As can best be seen from FIGS. 8c and 8d, and in particular the enlarged sectional view taken from FIG. 8c shown at 23, the main ring 21 of the stand can be formed in a similar manner to the sleeve part of the insert by forming a band into a cylinder and bonding the overlap in a suitable manner, for example by adhesives, welding or rivets.

It will be appreciated that, although the invention has been discussed in relation to a container comprising a glass receptacle such as the type found in the cafetiere, in fact the container could be the coffee cup itself. In that case the insert would be placed in the coffee cup either in a pre-filled form or with coffee material being poured into the insert thereafter, the plunger would be pushed down within the cup until it engaged the insert and the assembly could be removed. Such an arrangement would allow individual cups of coffee to be prepared in a desirable fashion.

Where the base of the insert is formed partially or totally of, for example, metallic gauze or other filter material, the plunger and insert may be drawn up and down repeatedly in the container prior to being withdrawn in order to strengthen the coffee.

As there may be some form of protrusion at the point where the plunger head and shaft are fastened a reinforcing plate which may be, for example, metallic can be incorporated at the corresponding part of the gauze base in order to reduce wear on the base.

The gauze base allows liquid to drain from the insert, but in any event, further liquid can be squeezed from the grains if the plunger is pushed further into the insert.

The gauze base also facilitates withdrawal of the plunger, as it allows liquid and air to pass through the insert.

It is possible to use the resilience of the gauze base to advantageous effect as shown with reference to FIGS. 9a and 9b. In this case the gauze base 3 is formed in the shape of a basket the upper open end of which is bonded to the inside of the sleeve 2 and the lower part of which depends from the sleeve 2 such that the insert 1 as a whole is effectively elongated. Because of the resilience of the gauze base which now extends below the sleeve 2, when the insert is dropped into a container the impact on the base of the container is significantly decreased reducing the risk of undesirable stresses on the container base.

Further optional cross-sectional insert profiles are shown in FIGS. 10a and 10b.

Referring firstly to FIG. 10a the insert 1 comprises a sleeve 2 and a gauze base 3. The gauze base 3 is downwardly convex or hemispherical and its largest diameter is equivalent to the internal diameter of the sleeve 2. It is bonded at this point to the sleeve 2 at a point intermediate the top and bottom of the insert. In the embodiment shown the base does not extend below the bottom edge of the sleeve 2 although it can do so in order to arrive at the advantages discussed in respect of the embodiments shown in FIGS. 9a and 9b. As a result of the shape of the gauze base 3, better air circulation is achieved in particular in the region where the gauze base is bonded to the sleeve 2 and in the area beneath that point. As a result, the drainage of the insert on retraction is improved.

With reference to FIG. 10b the gauze base is attached at its upper end to the sleeve 2 and extends downwardly from the sleeve and outwardly such that its greatest diameter is equivalent to or greater than the greatest diameter of the sleeve 2. This arrangement allows reduced impact on dropping the insert 1 into the container (as discussed with reference to the embodiment shown in FIGS. 9a and 9b) and also because of the parts of the gauze 3 which have "spread" radially, slows the insert as it drops into the container, further reducing impact.

Referring now to FIGS. 11a to 11d, a further alternative cross-sectional profile for the cup-shaped insert 1 is shown. The insert 1 has an upper portion 40 of a first diameter and a tapering lower portion 41 tapering to a second reduced diameter. The base which can be gauze, or the same material as the upper portion, or any other suitable material can be placed at the lower end of the lower portion 41 or may be shaped to comprise the whole of the lower part 41. The tapered portion of the insert 1 allows insertion of the insert into containers having an obstruction at their upper face. For example in some cases the containers have a handle 42 which hooks over the upper edge of the container.

Figure 11A:
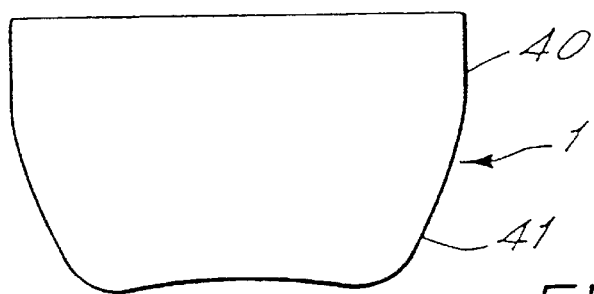
FIG. 11a is a side view of an alternative form of insert and container according to the present invention.
Figure 11B:
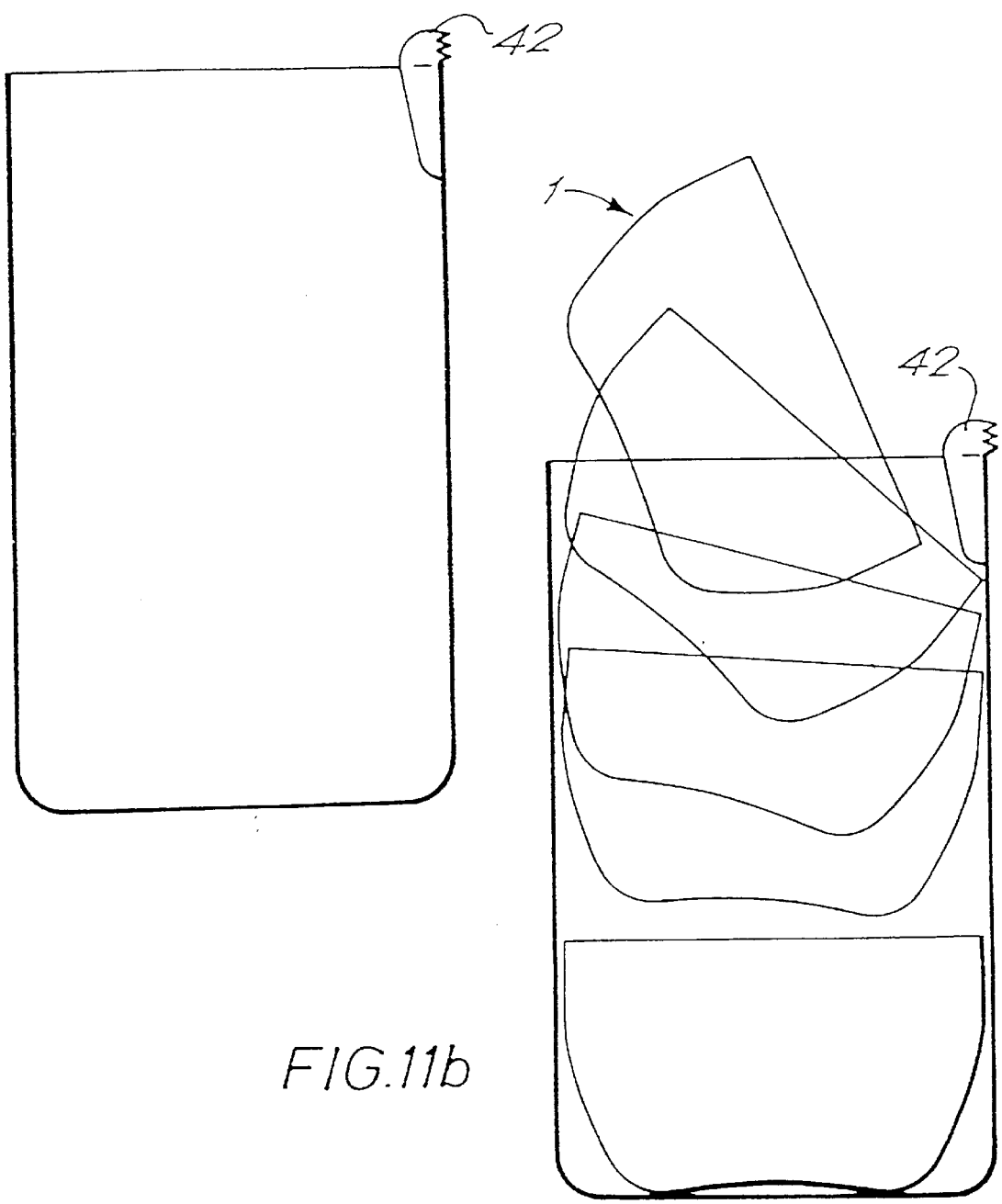
Figure 11C:
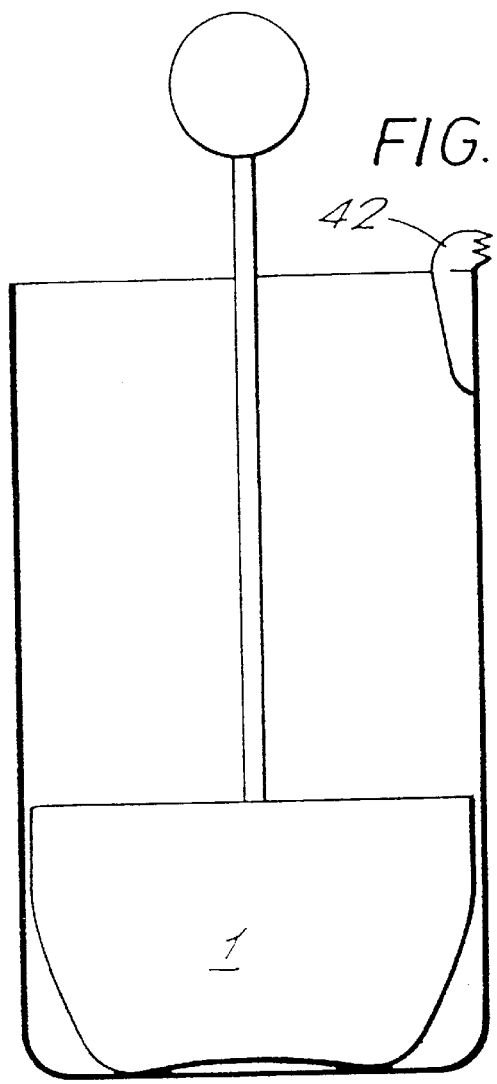
Figure 11D:
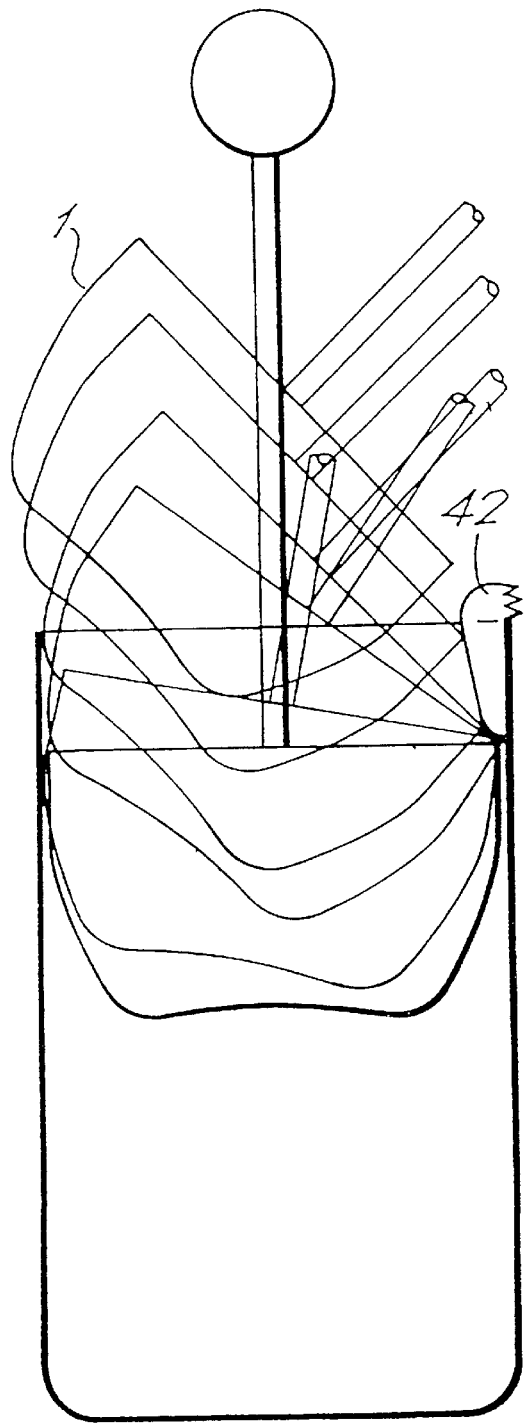

Insertion of the insert 1 is shown in FIG. 11b. The insert is tilted when first inserted to allow the large diameter upper portion to clear the handle 42. Once the handle portion 42 has been cleared the insert 1 can be rotated to its horizontal position, the tapered lower portion 41 allowing such rotation. As shown in FIG. 11c the plunger can then be inserted as discussed above and the assembly as a whole can be removed by reversing the operation for entry and in particular rotating the insert to clear the handle 42 as shown in FIG. 11d.

It is also possible to calibrate the insert in order to show the desired amount of coffee required for a given number of cups of coffee. Coffee grounds may be poured into the insert before or after it is inserted into the container. Alternatively, prepackaged inserts, which may be disposable or re-fillable, can be provided containing a predetermined quantity of coffee. Various vents, seals or bypasses can be included in the insert in order for example if it is felt necessary to prevent displacement of loosely packed infusible materials when a pre-filled insert is dropped into the container. For example, external contours can be provided on the insert or the insert can be sealed across its top by a material that is removed prior to brewing or disintegrates in contact with water.

The pre-filled inserts can be packed in moisture resistant and/or hermetically sealed wrapping. The pre-filled inserts may be individually wrapped or stacked together in desired numbers and wrapped in groups. Accordingly the pre-filled inserts can be distributed for domestic or catering purposes.

In another arrangement the insert is fully enclosed but perforated in parts, and attachable to a rod to form a one-piece plunger, in which infusible material is confined prior to making the beverage. In that case the filled plunger is inserted into the container before or after heated water is poured into the container, and removed once the beverage has brewed. For example, the insert can comprise a pre-filled disposable cylindrical container having perforated ends and a screw attachment for attaching to a corresponding formation on the rod. Alternatively, the insert may be openable and resealable in order that it can be filled and emptied each time a drink is brewed, so that it is re-usable.

It will be apparent that the arrangement described herein can be used for other beverage infusions than coffee, for example, tea, herbal drinks or medicinal infusions.

We claim:

1. A beverage infuser comprising a beverage container, a plunger having a perforated head slidable within the container and a cup-shaped insert wherein an upper portion of the insert has a smooth inner surface, and further wherein the plunger head has an outwardly resiliently biased perimeter of larger dimension than the inside of the insert and is slidable into engagement with the insert and adapted to releasably attach the insert to the plunger head through radial force of the plunger head against the smooth inner surface of the insert.

2. An infuser as claimed in claim 1 in which the container, plunger head and insert are of circular cross-section, the head including a perforated gauze material extending across the head and a spring extending around the perimeter of the head to provide an outward bias, the external diameter of the head being greater than the internal diameter of the insert.

3. An infuser as claimed in claim 2 in which at least a portion of the insert is perforated.

4. An infuser as claimed in claim 3 in which the insert comprises a side wall in the form of a sleeve, and a perforated base.

5. An infuser as claimed in claim 4 in which a portion of the base is reinforced.

6. An infuser as claimed in claim 1 in which the insert is calibrated for selected quantities of infusible material.

7. An infuser as claimed in claim 1 in which the insert is pre-filled with a predetermined quantity of infusible material.

8. An infuser as claimed in claim 1 further including a stand comprising a sleeve dimensioned to receive the insert and supports projecting downwardly from the stand to raise the stand above a supporting surface.

9. A beverage infuser as claimed in claim 1 in which the top end of the insert has dimension forming a snug fit with the container when the insert is in place in the container.

10. A method of making a beverage in a beverage infuser comprising a container, a plunger having a head slidable within the container and a cup-shaped insert wherein an upper portion of the insert has a smooth inner surface, the head having an outwardly resiliently biased perimeter of larger dimension than the inside of the insert comprising the steps of:

placing the insert at the base of the container;

introducing infusible material in the insert before or after said placing of the insert at the container base;

pouring heated water into the container;

inserting the plunger into the container;

sliding the plunger toward the base of the container into engagement with the insert, thereby attaching the outwardly resiliently biased plunger head to the inside of the insert through radial force of the plunger head against the smooth inner surface of the insert to confine the infusible material therebetween;

withdrawing from the container the plunger and insert attached thereto;

detaching the insert from the plunger; and disposing of the infusible material.

11. A method as claimed in claim 10 further comprising after the step of attaching the plunger head to the inside of the insert, the step of:

drawing the attached plunger and insert in a repeated up and down motion within the container.

12. A method as claimed in claim 11 further comprising after the step of withdrawing the plunger and insert, the step of:

pouring the beverage from the container.

13. A method as claimed in claim 10 further comprising after the step of withdrawing the plunger and insert, the step of:

pouring the beverage from the container.

14. A beverage infuser comprising a beverage container, a plunger having a plunger head including an outwardly resiliently biased perimeter of a larger dimension than an inside surface of an insert slidable within the container and an infusible material receiving receptacle having a smooth inner surface at an upper portion thereof, wherein the receptacle is arranged to be placed in the container and the plunger head is slidable into engagement with the receptacle to releasably attach the receptacle to the plunger head through radial force of the plunger head against the smooth inner surface of the receptacle for removal of the receptacle from the container.

15. An infuser as claimed in 14 in which the receptacle comprises an insert.

16. An infuser as claimed in claim 15 in which the receptacle comprises an insert having a side wall in the form of a sleeve and a base which extends below the lower end of the sleeve.

17. An infuser as claimed in claim 16 in which the insert includes an upper portion of a first maximum dimension and a lower portion of a lesser maximum dimension.

18. An infuser as claimed in claim 17 in which the insert includes a side wall in the form of a sleeve, and a base, the base being downwardly convex and joining the side wall intermediate the upper and lower edges of the side wall.

19. An infuser as claimed in claim 16 in which the base is perforated.

20. An infuser as claimed in claim 14 in which the receptacle comprises an insert.

21. An infuser as claimed in claim 14 further including a stand comprising a sleeve dimensioned to receive the insert and supports projecting downwardly from the stand to raise the stand above a supporting surface.

22. A beverage infuser comprising:

a beverage container and an infusible material confining means for insertion into the container, the infusible material confining means comprising a perforated infusible material confining head and a handle, the head being releasably fastenable to the handle; and a stand comprising a sleeve dimensioned to receive the head and supports projecting downwardly from the stand to raise the stand above a supporting surface.

* * * * *